United States Patent [19]

Ryan

[11] 4,314,886
[45] Feb. 9, 1982

[54] MECHANICALLY AGITATED LIQUID-VAPOR CONTACTING APPARATUS

[75] Inventor: Douglas G. Ryan, Rockaway, N.J.

[73] Assignee: Exxon Research & Engineering Co., Florham Park, N.J.

[21] Appl. No.: 158,374

[22] Filed: Jun. 11, 1980

Related U.S. Application Data

[63] Continuation-in-part of Ser. No. 974,071, Dec. 28, 1978, abandoned.

[51] Int. Cl.³ .................. C10G 73/10; B01D 11/04
[52] U.S. Cl. .................. 196/14.5; 196/14.52; 208/33; 261/114 R; 422/134; 422/135; 422/193; 422/225
[58] Field of Search .................. 196/14.5, 14.52; 261/114 R; 422/133–135, 188, 225, 193; 208/33, 35

[56] References Cited

U.S. PATENT DOCUMENTS

| | | | |
|---|---|---|---|
| 2,149,362 | 3/1939 | Riegler | 261/114 R X |
| 2,202,542 | 5/1940 | Voorhees | 208/35 |
| 2,722,505 | 11/1955 | Faulkner | 261/114 R |
| 2,746,846 | 5/1956 | Grunewald et al. | 196/14.52 X |
| 3,501,524 | 3/1970 | Krulick | 422/193 X |
| 3,542,747 | 11/1970 | Ennis et al. | 422/188 X |
| 3,549,513 | 12/1970 | Woodle | 208/33 |
| 3,719,455 | 3/1973 | Ohono et al. | 196/14.52 X |
| 3,720,599 | 3/1973 | Gould | 208/33 |
| 3,773,650 | 11/1973 | Hislop | 208/33 |

Primary Examiner—Michael S. Marcus
Attorney, Agent, or Firm—Edward M. Corcoran; Edward H. Mazer

[57] ABSTRACT

A liquid-vapor contacting apparatus comprising a vertical, mechanically agitated, elongated tower containing a plurality of vertically spaced, horizontally disposed stages therein and means for separating said stages, each of said stages comprising: (a) liquid tray means; (b) a liquid space and a vapor space above said liquid space; (c) weir means capable of maintaining a predetermined amount of liquid on said liquid tray means; (d) a first liquid downcomer means capable of providing a path for liquid from a stage or location immediately above said stage to the liquid space of said stage; (e) a second liquid downcomer means capable of providing a flowpath for the liquid in said stage to the next, lower, successive stage; (f) means capable of removing vapor from said vapor space including vapor downcomer means capable of providing a path for said vapor from said vapor space to the next lower, successive stage in a manner such that said vapor removed from said stage does not pass through liquid presenting any stage; (g) means for introducing liquid or vapor from a source external to said apparatus into or above the liquid space of said stage; and (h) means for mixing said liquid or vapor introduced into said stage with liquid present in said stage.

4 Claims, 1 Drawing Figure

U.S. Patent      Feb. 9, 1982      4,314,886
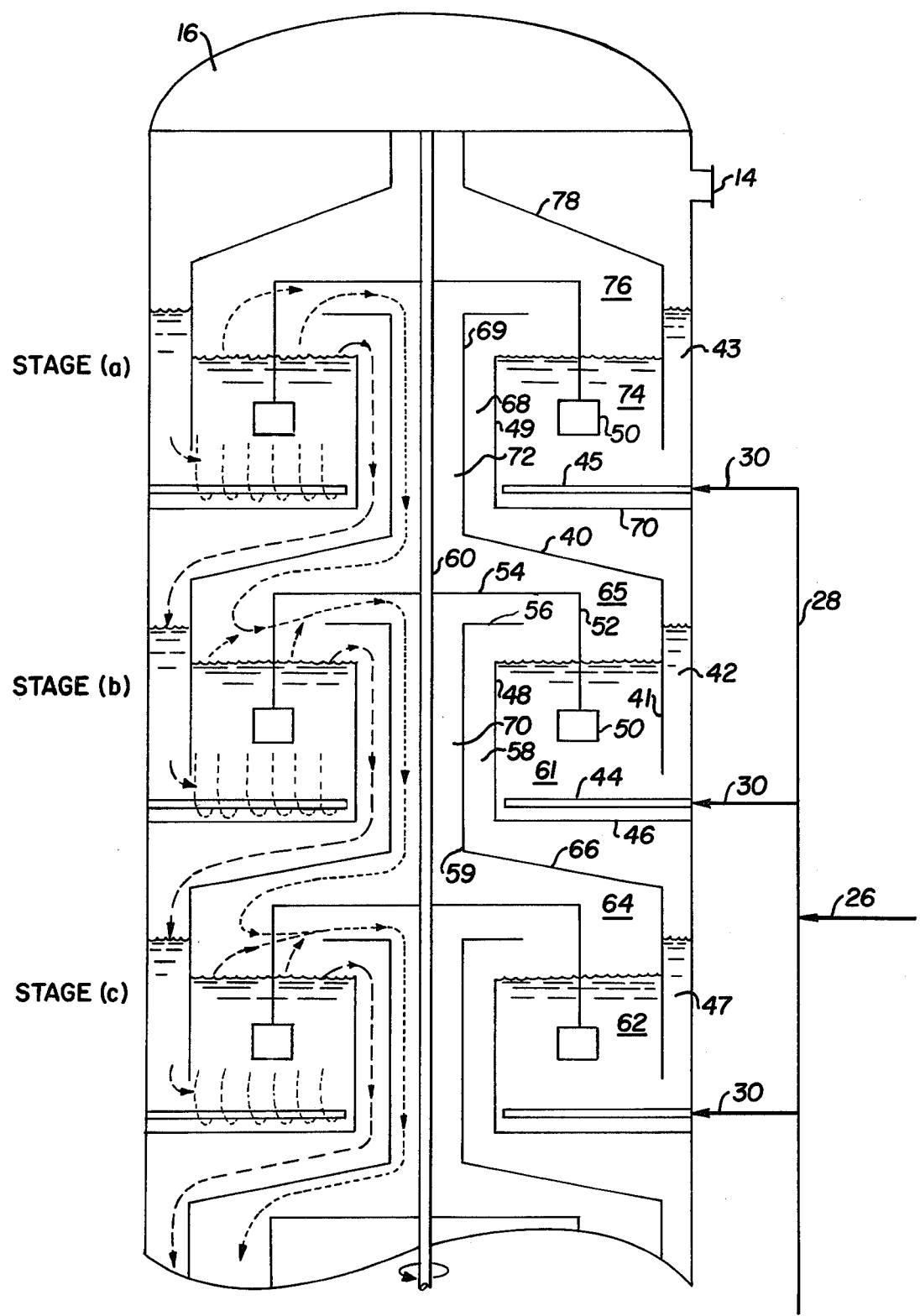
STAGE (a)
STAGE (b)
STAGE (c)
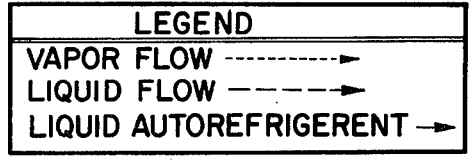
| LEGEND |
|---|
| VAPOR FLOW ----→ |
| LIQUID FLOW --→ |
| LIQUID AUTOREFRIGERENT → |

MECHANICALLY AGITATED LIQUID-VAPOR CONTACTING APPARATUS

CROSS-REFERENCE TO RELATED APPLICATION

This application is a continuation-in-part of Ser. No. 974,071 filed Dec. 28, 1978 and now abandoned.

BACKGROUND OF THE INVENTION

1. Field of the Invention

This invention relates to a vertical, multistaged, mechanically agitated liquid-vapor contacting apparatus. More particularly, this invention relates to a mechanically agitated, mutli-staged apparatus for liquid-liquid and liquid-vapor contacting. Still more particularly, this invention relates to vertical, multistaged, constant pressure towers containing mechanical agitators useful for dewaxing waxy hydrocarbon oils using liquid autorefrigerative dewaxing solvents or a combination of non-antorefrigerant and autofrigerant dewaxing solvents.

2. Description of the Prior Art

It is well known in the art to dewax wax-containing hydrocarbon oils, particularly the lube oil fractions of petroleum oil, in order to remove at least a portion of the wax therefrom to obtain a dewaxed oil of reduced cloud and pour points. The most common method of removing the wax or waxy constituents from waxy hydrocarbon oils is via the use of various solvent dewaxing processes. In solvent dewaxing processes the temperature of the wax-containing oil is lowered sufficiently to precipitate the wax therefrom as solid crystals of wax. At the same time, solvents are added to the waxy oil in order to improve the fluidity and reduce the viscosity thereof so that various filtration or centrifugation processes can be used to separate the solid particles of the wax from the dewaxed oil. Strong wax antisolvents (weak oil solvents) such as MEK are often added to decrease wax solubility in the oil/solvent mixture while strong oil solvents (weak wax antisolvents) such as MIBK or toluene are used to modify the solubility characteristics of the solvent so as to allow wax precipitation, while at the same time avoiding oil immiscibility at wax separation temperatures. Solvent dewaxing processes produce what is known as a pour-filter temperature spread. This is the temperature differential between the wax filtering temperature and the pour point of the dewaxed oil. This pour-filter temperature spread is greater when more non-polar hydrocarbon solvents are used than with more polar solvents such as ketones. Thus, an autofrigerant dewaxing process employing propane can produce a pour-filter spread of 40° F., which means that the wax filtration must be done at −40° F. in order to produce a dewaxed oil having a pour point of 0° F. When ketones or mixtures of ketone and aromatic solvents are used, the pour-filter spread may range from 0° F. to 20° F. depending on the oil and solvent used.

Both ketone and autofrigerant dewaxing processes have certain advantages and disadvantages. Thus, although ketone dewaxing processes result in a lower pour-filter spread at the wax filtration temperature and although larger wax crystals can be grown in a ketone environment than in an autorefrigerant environment without dewaxing aid, ketones are relatively non-volatile compared to autorefrigerants, and, therefore, chilling of the solvent/oil mixture must be accomplished by either indirect means or by mixing cold ketone solvent with the oil. In the latter case, practical considerations limit the amount and temperature of cold ketone solvent that can be added and the temperature to which the solvent/oil mixture can be cooled. Therefore, some means of indirectly chilling the waxy slurry following the addition of solvent is required in all ketone dewaxing processes in order to bring the slurry down to the required wax filtration temperature. The most common method of indirect chilling is via the use of scraped surface chillers which are expensive and difficult to maintain. Also, the scraped surface chillers tend to damage the wax crystals by the shearing action of the scraper blades.

Conversely, wax crystals grown in an autorefrigerant environment, such as propane or propylene, are generally small which necessitates the use of costly dewaxing aids in order to achieve good filtration rates, although evaporation of the autorefrigerant enables one to reach the wax filtration temperature without the necessity of employing scraped-surface chillers or indirect heat exchangers following the solvent dewaxing operation. Additionally, it has been found necessary to employ batch chilling in autorefrigerant dewaxing processes in order to allow a gradual reduction in pressure. This prevents sudden flashing of the autorefrigerant at the point of pressure release, thereby avoiding sudden large temperature drops of the oil slurry (shock chilling), which would result in even smaller wax crystals and concomitant slower filter rates of the wax from the dewaxed oil.

In some ketone solvent dewaxing processes, the waxy oil and solvent, at a temperature above the cloud point of the oil, are mixed before being cooled. This solution is then cooled at a uniform, slow rate under conditions which avoid agitation of the solution as the wax precipitates out. In another method, ketone dewaxing solvent is added to the oil at several points along a chilling apparatus, but the waxy oil is first chilled without solvent until some wax crystallization has occurred and the mixture has thickened considerably, after which a first increment of solvent, at the temperature of the oil, is introduced in order to maintain fluidity. Cooling continues, more wax is precipitated out and a second increment of solvent, at the temperature of the mixture, is added to maintain fluidity. This process is repeated until a temperature typically ranging from about 30° F. to 60° F. is reached, at which point an additional amount of solvent at the same temperature as the mixture is added in order to reduce the viscosity of the mixture which is further chilled in scraped-surface chillers to the desired filtration temperature. In these processes, if the solvent is introduced at a temperature lower than that of the oil or oil/solvent mixture, shock chilling occurs resulting in the formation of small and/or acicula shaped waxy crystals with attendant poor filter rate.

It is now well known that the adverse shock chilling effect can be overcome by introducing the waxy oil into an elongated, staged cooling zone or tower at a temperature above its cloud point and incrementally introducing cold dewaxing solvent into said zone, along a plurality of points or stages therein, while maintaining a high degree of agitation in said stages, so as to effect substantially instantaneous mixing of the solvent and wax/oil mixture as they progress through said zone. The basic concept of this commercially successful process is disclosed in U.S. Pat. No. 3,773,650, the disclosures of which are incorporated herein by reference and shall hereinafter be referred to as DILCHILL* dewaxing process.

*Registered service mark of Exxon Research and Engineering Company.

Commercially successful processes employing autorefrigerative cooling, wherein the waxy oil is mixed with a liquid autorefrigerant which is permitted to evaporate thereby cooling the oil by the latent heat of evaporation, are batch or semi-batch operations. This mixture of liquid autorefrigerant and oil are introduced into an expansion chamber wherein the pressure is slowly reduced to achieve controlled evaporation of the autorefrigerant and controlled cooling of the oil, thus avoiding the shock chilling which would result if the autorefrigerant were allowed to flash off. However, batch processes are cumbersome, difficult to operate and energy inefficient.

A number of attempts have been made to develop a continuous autorefrigerant process for dewaxing oils, including combinations of ketone/autorefrigerant processes. Thus, U.S. Pat. No. 3,549,513 discloses an autorefrigerative batch dewaxing process that is described as continuous, but which really operates via the sequential use of a multiple number of batch chillers or expansion chambers. Waxy oil is diluted with an aromatic/ketone solvent mixture and with liquid autorefrigerant and cooling is achieved by controlled evaporation of the autorefrigerant by reducing the pressure in each batch chamber in a manner such that the autorefrigerant evaporates at a controlled rate. U.S. Pat. No. 3,658,688 discloses an autorefrigerant dewaxing process wherein a portion of the wax is precipitated from the oil in a DILCHILL dewaxing tower wherein the cooling occurs by the injection of cold autorefrigerant into the tower to produce a waxy slurry, followed by autorefrigerative cooling of the slurry in batch chillers. U.S. Pat. No. 2,202,542 suggests a continuous autorefrigerant dewaxing process wherein a waxy oil above its cloud point is premixed with warm, liquid propane. This mixture is introduced into a multi-staged cooling tower and liquid $CO_2$ is injected into each stage out of direct contact with the oil. This patent emphasizes the point that the liquid $CO_2$ must be introduced into each stage out of direct contact with the oil in the tower in order to avoid shock chilling. However, this is impractical because the vapor loads on the tower would be far in excess of what could be accommodated in a reasonably sized commercial tower. Also, refrigeration requirements are three times those normally needed and conditions for nucleation and growth of wax crystals are poor. U.S. Pat. No. 3,720,599 discloses a continuous process for dewaxing a waxy petroleum oil stock wherein the oil is premixed with acetone. This mixture is then introduced into a horizontal, elongated chilling vessel containing a plurality of stages operating at different pressures, with the pressure in each stage controlled by a back pressure regulator on each stage. Liquid autorefrigerant is introduced into the stages along the length of the chilling vessel while maintaining a high degree of agitation therein to avoid shock chilling. The autorefrigerant is partially evaporated in each stage, with the amount of evaporation being controlled by the pressure in each stage. Unfortunately, there are problems which currently preclude commercialization of this process, not the least of which is a practical, efficient way of getting the slurry to flow from stage to stage without plugging up the entire apparatus with wax or without multiple transfer pumps which would be expensive and would also tend to destroy the wax crystal structure. Another disadvantage entails the impracticality of providing separately driven agitators for each stage and the mechanical difficulties associated with a common horizontal drive shaft. Additionally, U.S. Pat. No. 3,720,599 provides for the nucleation and initial growth of wax to occur in the presence of substantial amounts (i.e., >25%) of autorefrigerant solvent, which, in the absence of dewaxing aid, has been found to produce wax crystals inferior to those produced when nucleation occurs by chilling in the presence of ketones or ketone/aromatic solvents followed by autorefrigeration. For example, when mixtures of ketone and high percentages (>40%) of propylene were used in the DILCHILL dewaxing process, a distillate oil/wax slurry was produced which filtered very poorly.

It would be an improvement to the art if one could invent a gas-liquid contacting apparatus that would be suitable to use for combining both ketone and autorefrigerant solvent dewaxing processes into a continuous process, in a single apparatus, and in such a manner so as to carefully form the wax nuclei and begin crystal growth in a substantially non-autorefrigerant solvent environment such as ketone, to achieve large, stable, spherical crystals without the use of dewaxing aid and then further precipitate additional wax without destroying the spheres via direct contact with an evaporating autorefrigerant, thereby avoiding the need for scraped surface chillers following the ketone dewaxing step.

SUMMARY OF THE INVENTION

What has now been discovered is an apparatus comprising a vertical, elongated tower containing a plurality of vertically spaced, horizontally disposed stages therein, means for mechanically agitating a liquid or vapor introduced into each of said stages with liquid present in said stages by means of agitator means mounted to a single shaft driven by a single driver means, and means for separating said stages one from the other while defining fluid communication channels between said stages, each of said stages comprising (a) liquid tray means horizontally attached to the interior walls of the elongated, vertical tower; (b) weir means attached vertically to the liquid tray means along the interior perimeter of the tray means at some distance from the interior walls of the tower thereby defining (1) a liquid-vapor stage comprising a liquid space and a vapor space over said liquid space, which maintains a predetermined amount of liquid on said liquid tray means in said liquid space between the weir and the tower wall and (2) a fluid communication channel; (c) a first liquid downcomer means defining a liquid communication channel in the fluid communication channel leading from the liquid space of the liquid-vapor stage immediately above the recited liquid-vapor stage to the recited liquid-vapor stage; (d) a second liquid downcomer means defining a second liquid communication channel leading from the liquid space of the recited liquid-vapor stage to the liquid space of a liquid stage immediately below the recited liquid-vapor stage; (e) first vapor downcomer means defining a vapor communication channel in the fluid communication channel defined by the weir means attached to the tray means leading from the vapor space immediately above the liquid space of the liquid-vapor stage immediately above the recited liquid-vapor stage to the vapor space immediately above the recited liquid-vapor stage; (f)

second vapor downcomer means defining a second vapor communication channel leading from the vapor space immediately above the liquid space of the recited liquid-vapor stage to the vapor space immediately above the liquid space of the liquid-vapor stage immediately below the recited liquid-vapor stage, wherein the liquid downcomers and vapor downcomers maintain the liquids and vapor as separated distinct streams forced to flow downwardly in parallel flow by the absence of vapor outlet means at the top of the tower and the vapor stream does not pass through any liquid in any successive lower stage; (g) means for introducing a liquid or a vapor from a source external to said apparatus into the liquid space of the liquid-vapor stage at a point below the liquid level in the liquid-vapor stage, or if only liquid is introduced, at a point above the liquid level of the liquid-vapor stage.

DESCRIPTION OF THE DRAWING

The attached FIGURE illustrates a section of an apparatus comprising a preferred embodiment of this invention.

DETAILED DESCRIPTION

Referring to the drawing, the apparatus comprises a vertical, cylindrical tower 16 containing a plurality of vertically spaced, horizontally disposed stages. For the sake of brevity, only three stages are illustrated, stages (a), (b), and (c). It can be seen that stage (b) is separated from stages (a) and (c) via stage separator means 40 and 66. The stage separator means may be simply metal discs or cones concentric with the walls of the tower and having an opening in the center thereof to form an annulus around vertical shaft 60. This hole will be of a size sufficient to allow passage therethrough of shaft 60 and passage of vapors from the stage above the separator to the stage below the separator. The vapor and liquid downcomer means are defined primarily by a series of concentric, cylindrically shaped baffles. Thus, for stage (b) the liquid downcomer means illustrated by flow path 42 feeding liquid space 61 is defined by the cylindrical wall of the apparatus and cylindrical baffle 41. The top of baffle 41 is connected to the outer circumference of separator 40 which serves to seal vapors in stage (b) in vapor space 65. Connecting the top of baffle 41 to separator 40 also serves to provide a path for liquid from stage (a) coming down downcomer means 68 to downcomer means 42. Liquid tray means 46 may be a flat plate in the shape of an annulus, the outer perimeter of which is attached to the wall of the apparatus with the inner perimeter being attached to weir means 48, thus defining liquid space 61. Weir means 48 may also be a cylindrically shaped baffle the bottom of which is attached to tray means 46. The liquid downcomer means is a conduit shown as liquid flow path 58 and is defined in part by weir means 48 and in part by cylindrical baffle 59. Baffle 59 may also be merely a metal cylinder the top of which is attached to baffle 56 and the bottom being attached to separator means 66. It is readily seen that vapor downcomer means 70 is also a conduit defined by the annulus formed between shaft 60 and cylindrical baffle 59. Baffle 56 forms part of the vapor removal means and also serves as a splash shield to prevent liquid from entering vapor conduit 70. Liquid mixing means is shown as a combination of disc 54, arms 52 and paddles 50. Rotating shaft 60 is attached to and passes through the middle of disc 54. A plurality of arms 52 depend downwardly from the outer periphery of disc 54 and the lower ends thereof are attached to paddles 50. Liquid or vapor is introduced into liquid space 61 of stage (b) from a source outside the apparatus via means 44 which may be a simple liquid or vapor distributor such as a ring distributor which may be a cylindrical, perforated pipe attached to outside liquid or vapor source 30 by means not shown.

The invention will be more readily illustrated by reference to a preferred embodiment.

PREFERRED EMBODIMENTS

Although liquid may be introduced into the apparatus of this invention for any desired purpose such as extraction, washing, reacting, dewaxing, etc., in preferred embodiments, the apparatus of this invention will be used as an autorefrigerant solvent dewaxing tower operating at a pressure of from about 0 to 50 psig. Thus, a waxy hydrocarbon oil such as a petroleum lube oil fraction, at a temperature above its cloud point and prediluted with non-autorefrigerative dewaxing solvent, such as ketone, is introduced into tower 16 via feed inlet 14 and separator 78, enters downcomer 43 and is directed into the liquid space 74 of stage (a). At the same time, a cold autorefrigerant dewaxing solvent such as liquid propane or propylene is fed into line 26, manifold 28, multiple injection points 30 (one of which is connected to distributor 45 by means not shown) and to ring distributor 45 which is a perforated pipe with the perforations preferably facing downward so that the flow of liquid autorefrigerant opposes the flow of the prediluted warm waxy oil entering liquid space 74 from downcomer 43. Most of the liquid autorefrigerant evaporates on contact with the prediluted oil thereby cooling same, with the autorefrigerant vapors produced rising up into vapor space 76 and passing down through downcomer 72 to vapor space 65 of stage (b) wherein the vapors are combined with autorefrigerant vapors produced in stage (b), the combined vapors then passing down through vapor downcomer 70 to vapor space 64 of stage (c), etc. This process is sequentially repeated down the tower. The liquid autorefrigerant is mixed with the warm, waxy oil substantially instantaneously via the turbulence produced by the evaporating autorefrigerant and the mixing action of paddles (78). Thus, the oil is cooled in stage (a) and passes over weir 49 into liquid downcomer 68, across at least a portion of the upper surface of separator 40 and into downcomer 42 wherein it is directed into the liquid space 61 of stage (b) wherein the process is repeated. Thus, the oil is further chilled in liquid space 61 of stage (b) by the injection of liquid autorefrigerant into the oil from distributor 44. The further chilled oil passes over weir 48 wherein it enters downcomer 58 and passes down into downcomer 47 of stage (c) wherein it is directed into liquid space 62. Thus, the process repeats itself as the oil passes from stage to stage down through the tower. This produces a waxy slurry which is further chilled down to wax filtration temperature and then fed directly from the apparatus to rotary pressure filters to separate the wax from the oil without having to first be passed to either batch chillers or through scraped surface chillers.

One of the unusual and useful features of using the apparatus of the present invention for constant pressure autorefrigerative dewaxing lies in the parallel flow of both the liquid and vapor down the tower. This is schematically represented in the FIGURE by dashed lines for liquid flow and dotted lines for vapor flow. Down-flow vapors avoid chilling the metal surfaces in the apparatus to a temperature lower than the oil or waxy slurry that contacts same which could result in wax deposition and/or shock chilling of the waxy oil. The vapor formed in stage (a) bubbles through the oil and leaves the stage at about the same temperature as the oil. Thus, both the oil and vapor leave stage (a) at approximately the same temperature which results in both surfaces of baffle 69 and both surfaces of stage separator 40 being at the same temperature. If the vapor was colder than the oily liquid coming from stage (a) the vapor would cool baffle 69 and stage separator 40 to a temperature lower than the oily liquid passing through 69 and across 40. This could cause wax deposition of the oil and/or shock chilling. Similarly in stage (b), the vapor formed therein leaves the surface of the oily liquid at the same temperature as said liquid, mixes with the warmer vapor from stage (a), with the result that as the vapors continually mix and pass from stage to stage down the tower, the mixed vapors are either warmer or at the same temperature as the oily liquid or slurry at the same general location in the tower. This avoids wax buildup and shock chilling of the oil.

In yet another preferred embodiment of this invention, waxy oil or a wax/oil slurry can be introduced as feed to said tower and cold ketone dewaxing solvent or any non-autorefrigerant dewaxing solvent can be injected into the first several stages to form wax crystals in a ketone or non-autorefrigerant environment with liquid autorefrigerant being injected into those later, subsequent stages in which the liquid contained therein is a waxy slurry. Still further, a waxy slurry may be introduced into the apparatus as the feed with further chilling and wax precipitation therefrom occurring by constant pressure autorefrigerative chilling in the apparatus.

It should be understood, of course, that it is within the scope and spirit of this invention to use one or more units of the apparatus either in series or in parallel.

What is claimed is:

1. An apparatus comprising a vertical, elongated tower having a feed inlet at the top and liquid and vapor outlets in a lower section, said apparatus containing a plurality of vertically spaced, horizontally disposed stages therein, means for mechanically agitating a liquid or vapor introduced into each of said stages with liquid present in said stages by means of agitator means mounted to a single shaft driven by a single driver means, and means for separating said stages one from the other while defining fluid communication channels between said stages, said stages comprising (a) liquid tray means horizontally attached to the interior walls of the elongated, vertical tower; (b) weir means attached vertically to the liquid tray means along the interior perimeter of the tray means at some distance from the interior walls of the tower thereby defining (1) a liquid-vapor stage comprising a liquid space and a vapor space over said liquid space, which maintains a predetermined amount of liquid on said liquid tray means in said liquid space between the weir and the tower wall and (2) a fluid communication channel; (c) a first liquid downcomer means communicating with said stage separation means to define a liquid communication channel in the fluid communication channel leading from the liquid space of the liquid-vapor stage immediately above the recited liquid-vapor stage to the recited liquid-vapor stage; (d) a second liquid downcomer means defining a second liquid communication channel leading from the liquid space of the recited liquid-vapor stage to the liquid space of a liquid stage immediately below the recited liquid-vapor stage; (e) a first vapor communication channel in the fluid communication channel defined by said first liquid downcomer means leading from the vapor space immediately above the liquid space of the liquid-vapor stage immediately above the recited liquid-vapor stage to the vapor space immediately above the recited liquid-vapor stage; (f) vapor downcomer means defining a second vapor communication channel leading from the vapor space immediately above the liquid space of the recited liquid-vapor stage to the vapor space immediately above the liquid space of the liquid-vapor stage immediately below the recited liquid-vapor stage, wherein the liquid downcomers and vapor downcomer maintain the liquids and vapors as separated distinct streams forced to flow downwardly in parallel flow by the absence of vapor outlet means at the top of the tower and wherein the vapor stream does not pass through any liquid in any successive lower stage; (g) means for introducing a liquid or a vapor from a source external to said apparatus into the liquid space of the liquid-vapor stage at a point below the liquid level in the liquid-vapor stage, or if only liquid is introduced, at a point above the liquid level of the liquid-vapor stage.

2. The apparatus of claim 1 wherein said vapor and liquid downcomer means comprise conduits formed by concentric, cylindrical baffles.

3. The apparatus of claim 2 wherein said stage separation means comprises a cone-shaped baffle with a hole in the middle thereof so that said separator has an outer and an inner perimeter.

4. An apparatus operating at a constant pressure ranging from about 0 to 50 psig for continuously solvent dewaxing waxy hydrocarbon oils comprising a vertical, elongated tower having a feed inlet at the top and liquid and vapor outlets in a lower section, said apparatus containing a plurality of vertically spaced, horizontally disposed stages therein, means for mechanically agitating a liquid or vapor introduced into each of said stages with liquid present in said stages by means of agitator means mounted to a single shaft driven by a single driver means, and means for separating said stages one from the other while defining fluid communication channels between said stages, said stages comprising: (a) oil or slurry tray means horizontally attached to the interior walls of the elongated vertical tower; (b) weir means attached vertically to the oil or slurry tray means along the interior circumference of the tray means at some distance from the interior walls of the tower thereby defining (1) a liquid-vapor stage comprising an oil or slurry space and a vapor space over said liquid space, which maintains a predetermined amount of oil or slurry on said oil or slurry tray means in said liquid space between the weir and the tower wall and (2) a fluid communication channel; (c) a first liquid downcomer means communicating with said stage separation means to define an oil or slurry communication channel in the fluid communication channel leading from the oil or slurry space of the liquid-vapor stage immediately above the recited liquid-vapor stage to the recited liquid-vapor stage; (d) a second liquid downcomer means defining a second oil or slurry communication channel leading from the oil or slurry space of the recited liquid-vapor stage to the oil or slurry space of the liquid-vapor stage immediately below the recited liquid-vapor stage; (e) means for introducing cold, liquid autorefrigerative or non-autorefrigerative dewaxing solvent from a source external to said apparatus into the oil or slurry space of the liquid vapor stage at a point above or below the oil or slurry level in the liquid-vapor stage; (f) a first vapor communication channel in the fluid communication channel defined by said first liquid downcomer means, said first vapor communication channel leading from the vapor space immediately above the oil or slurry space of the liquid-vapor stage which is immediately above the recited liquid-vapor stage to the vapor space immediately above the recited liquid-vapor stage; (g) vapor downcomer means defining a second vapor communication channel leading from the vapor space immediately above the oil or slurry space of the recited liquid-vapor stage to the vapor space immediately above the oil or slurry space of the liquid-vapor stage which is immediately below the recited liquid-vapor stage, wherein the liquid downcomers of (c) and (d) and the vapor downcomer of (g) maintain the liquids and vapors as separate, distinct streams forced to flow downwardly in parallel flow by the absence of vapor outlet means at the top of the tower and the vapor stream does not pass through any liquid in any successive lower stage.

* * * * *